April 17, 1956 G. H. RENDEL 2,742,150
APPARATUS FOR GAGING AND CLASSIFYING SHEETS OR THE LIKE
Filed Jan. 26, 1954 2 Sheets-Sheet 1

INVENTOR.
GEORGE H. RENDEL
BY Donald G. Dalton
HIS ATTORNEY

April 17, 1956  G. H. RENDEL  2,742,150
APPARATUS FOR GAGING AND CLASSIFYING SHEETS OR THE LIKE
Filed Jan. 26, 1954  2 Sheets-Sheet 2

*INVENTOR.*
GEORGE H. RENDEL
BY *Donald G. Dalton*

*HIS ATTORNEY* ved prior to my invention.
United States Patent Office
2,742,150
Patented Apr. 17, 1956

2,742,150

APPARATUS FOR GAGING AND CLASSIFYING SHEETS OR THE LIKE

George H. Rendel, Mount Lebanon, Pa., assignor to United States Steel Corporation, a corporation of New Jersey Application January 26, 1954, Serial No. 406,259

14 Claims. (Cl. 209—82)

This invention relates to apparatus for gaging and classifying sheet material such as tin plate and is a continuation-in-part of my copending application, Serial No. 254,418, now abandoned, filed November 1, 1951. Such sheets must be within a certain thickness range to be acceptable to the customer. However, such off-gage sheets can be used for other orders. It is desirable therefore that the sheets be classified according to gage. To my knowledge, no suitable apparatus for automatically gaging and classifying such sheet material has been developed prior to my invention.

It is an object of my invention to provide apparatus which will automatically gage and classify thin material such as sheets.

This and other objects will be more apparent after referring to the following specification and attached drawings, in which.

Figure 1:
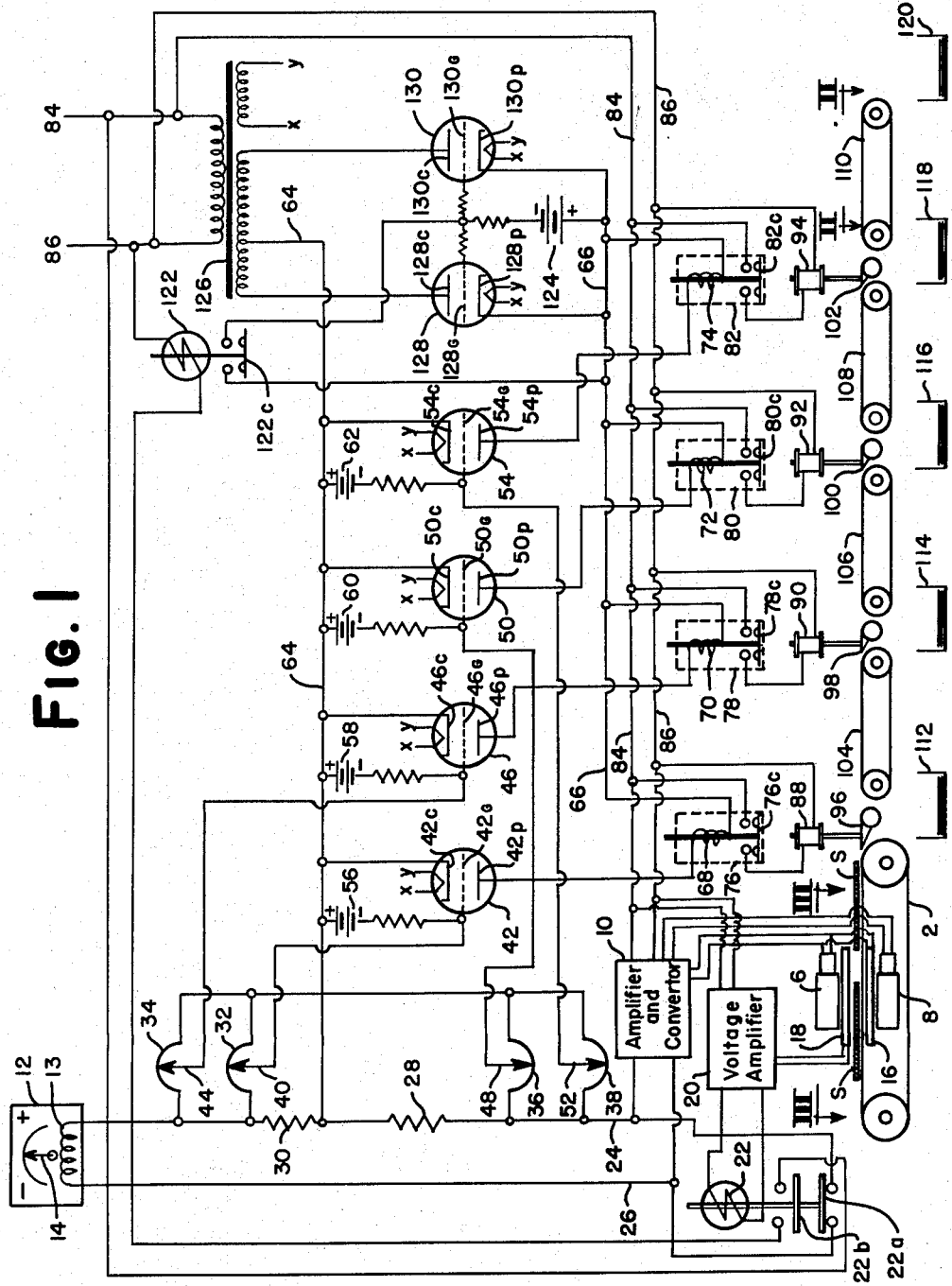
Figure 1 is a schematic showing of the classifying apparatus and wiring diagram therefor.

Referring more particularly to the drawings, the reference numeral 2 indicates a conveyor over which sheets S to be classified pass in closely spaced relationship. The conveyor 2 is preferably a belt conveyor having a pair of spaced apart belts 4 for supporting the sheets. While any type gage may be used, it is preferred to use a non-contact type gage in which a radiation source 6 is provided on one side of the sheet as it passes over the conveyor 2 and a detector 8 is arranged on the other side of the sheet. When there is no sheet in the gage a strong signal will be received by the radiation detector 8 which will be impressed on the amplifier and convertor 10. The amplified signal will be applied to the meter 12 which is a standard zero center instrument in which the current flowing through its element 13, causing its pointer to move toward the plus side, will be of opposite polarity to the current causing the pointer to move toward the minus side. The large current flowing through the element when no sheet is in the gage will cause damage to the meter 12 and therefore means are provided to prevent this occurrence as will be explained hereinafter. When a sheet is in the gage the amount of radiation received by the detector 8 is reduced. If the sheet is of the desired gage, the pointer 14 of meter 12 will be in the center position shown, while if it is off-gage, the pointer will swing to the minus or plus side depending upon whether the sheet is thicker or thinner than the desired gage. In order to prevent a large current from flowing through the element 13 of meter 12 when there is no sheet in the gage, a lamp 16 is provided between the detector 8 and the sheet S and a photoelectric cell 18 is provided between the radiation source 6 and the sheet S. The photoelectric cell 18 will receive light from the lamp 16 as long as a sheet S does not completely cover it. When a sheet passing through the gage completely intersects the light beam, an impulse from photoelectric cell 18 will be impressed on voltage amplifier 20. The amplified impulse will energize relay coil 22 which is provided with normally closed contacts 22a and normally open contacts 22b. Normally closed contacts 22a are arranged in a by-pass circuit between wires 24 and 26 leading to the element 13 of meter 12. Therefore, no current will flow to the meter 12 until the relay contacts 22a open, thus removing the by-pass circuit. This only occurs when a sheet S is in the gage.

Located in the connection 24 are resistors 28 and 30. Connected in parallel across resistor 30 are potentiometers 32 and 34. In like manner potentiometers 36 and 38 are connected in parallel across resistor 28. The contact arm 40 of potentiometer 32 is connected to the grid 42G of an amplifying tube 42. The movable contact arm 44 of potentiometer 34 is connected to the grid 46G of an amplifying tube 46. The movable contact arm 48 of potentiometer 36 is connected to the grid 50G of an amplifying tube 50. The movable contact arm 52 of potentiometer 38 is connected to the grid 54G of an amplifying tube 54. Tubes 42, 46, 50 and 54 are normally maintained non-conducting by the application of a negative potential impressed on their respective grids by batteries 56, 58, 60 and 62, respectively. The tubes 42, 46, 50 and 54 are connected across D. C. power lines 64 and 66. Relay coils 68, 70, 72 and 74 are connected in series with the tubes 42, 46, 50 and 54, respectively. The relay coils 68, 70, 72 and 74 are located in synchrotimers 76, 78, 80 and 82, respectively, and are provided with normally open contacts 76c, 78c, 80c and 82c. The synchrotimers 76, 78, 80 and 82, which are standard equipment such as shown in Ladrach Patent No. 2,217,342, dated October 8, 1940, are mechanically driven from conveyor 2. Power from lines 84 and 86 is provided to solenoids 88, 90, 92 and 94 through contacts 76c, 78c, 80c and 82c, respectively. When solenoids 88, 90, 92 and 94 are energized, they raise deflector gates 96, 98, 100 and 102, respectively. The deflector gate 96 is located at the end of conveyor 2. Deflector gates 98, 100 and 102 are located at the exit ends of conveyors 104, 106 and 108, which are arranged in tandem with each other and conveyor 2. A conveyor 110 is located beyond the deflector 102. Bins 112, 114, 116, 118 and 120 are located below the exit ends of conveyors 2, 104, 106, 108 and 110, respectively. Since the synchrotimers 76, 78, 80 and 82 are set according to the speed of the conveyors, the respective deflector gates will open at the proper time to deflect sheets from their normal path of travel.

A relay coil 122 is connected across the wires 84 and 86 in series with normally open contacts 22b. Relay coil 122 has normally open contacts 122c which are connected in circuit with a battery 124. A center tap transformer 126 has its primary winding connected to the lines 84 and 86 and its center tap connected to the wire 64. Rectifying tubes 128 and 130 are connected in parallel from the secondary of transformer 126 to the wire 66. The tubes 128 and 130 are normally held non-conducting by means of a negative potential supplied from battery 124 to grids 128G and 130G. The transformer and rectifying tube circuit provides a D. C. power source having suitable characteristics.

Figure 4:
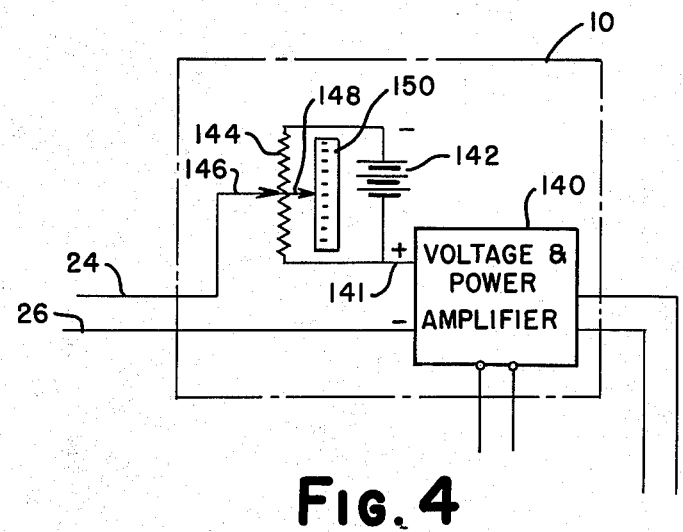
Figure 4 is a schematic view of a wiring diagram which may be incorporated in my invention.
Figure 3:
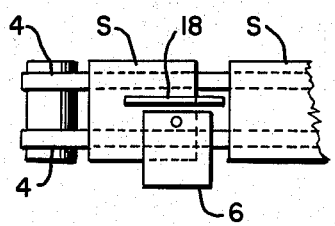
Figure 3 is an enlarged plan view taken on the line III—III of Figure 1.
Figure 2:
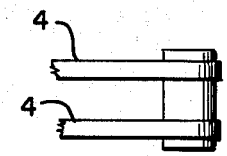
Figure 2 is an enlarged plan view taken on the line II—II of Figure 1.

The amplifier and converter 10 contains the necessary circuits for changing the impulse from the gage 8 to substantially zero when a sheet of the desired thickness is in the gage and to a direct current voltage of either plus or minus polarity when an off-gage sheet is in the gage. One circuit for this purpose as shown in Figure 4 includes a voltage and power amplifier 140, the negative output lead of which is connected to wire 26. The positive output lead 141 of amplifier 140 is connected to a dominant circuit including battery 142 and adjustable potentiometer 144 which is provided with a movable contact arm 146 connected to the lead 24 in such manner that the voltage due to the IR drop between tap 146 and the connection to lead 141 is substantially constant. A pointer 148, associated with a calibrated dial 150, is connected for movement with the arm 146. Zero reading on meter 13 and zero potential on wires 24 and 26 is obtained by means of this circuit. To calibrate the gage a sheet S of the desired thickness is positioned between radiation source 6 and detector 8. Zero signal on the wires 24 and 26 is obtained by adjusting the movable contact arm 146 on the potentiometer 144 to the position where the potential between contact arm 146 and lead 141 is equal in value to the potential on wires 26 and 141. Passage of a sheet thicker than the desired gage will reduce the value of the signal on wires 26 and 141 and passage of a sheet thinner than the desired gage will increase the value of that signal. Thus there is zero potential and zero current between wires 24 and 26 when a sheet of the correct thickness passes through the gage. When a sheet is thicker than desired the signal between wires 26 and 141 will be small and current will flow in one direction in the gaging circuit and when the sheet is thinner than the desired gage the signal between wires 26 and 141 will be large and the current in the gaging circuit will flow in the other direction. Other suitable circuits which may be used in the amplifier and convertor 10 are shown in the patents to Clapp No. 2,488,269 and Bernstein No. 2,518,115.

The operation of the device is as follows:

Assuming that a sheet which is 10% over-gage is passing through the gage, the relay coil 22 will be energized thus opening contacts 22a and closing contacts 22b. Opening of contacts 22a permits current to flow to the meter 12 which will indicate that the sheet is 10% or more overweight. The closing of contact 22b will complete a circuit through relay coil 122 which is a time delay closing device. Energization of coil 122 closes contacts 122c thus removing the negative bias on the grids of tubes 128 and 130. This permits the tubes 128 and 130 to conduct until the contacts 122c again open after the sheet passes from the gage. There will be a voltage drop across resistors 28 and 30 so that lead 24 adjacent the element 13 will be positive with respect to the wire 64. This positive potential will apply a positive potential on grids 42G and 46G through the potentiometers 32 and 34. The proportioning of this potential may be preset by positioning the slider arms 40 and 44. This potential will be of sufficient amplitude to permit tubes 42 and 46 to conduct current. Due to the time delay of relay 122 the grid potentials on tubes 42 and 46 will be stabilized at a value representative of the thickness of the sheet being gaged by the time contacts 122c close. The closing of contacts 122c permits the tubes 128 and 130 to pass current which will establish a potential between wires 64 and 66 and permit tubes 42 and 46 to conduct, thus energizing coils 68 and 70 of the synchrotimers 76 and 78. This will cause the contacts 76c and 78c to close, thus energizing coils 88 and 90 to open the deflector gates 96 and 98 just prior to entry of the gaged sheet which will be diverted into the bin 112. When the sheet being gaged has progressed to the point where the light from the light source 16 again strikes the photo-sensitive device 18, relay 22 is deenergized, thus closing contacts 22a and opening contacts 22b. This causes the current flowing through meter 12 to be by-passed and opens contacts 122c to deenergize the classifying system. Assuming that the next sheet is only 5% overgage, the operation will be the same as above except that there will be a smaller potential drop across resistors 28 and 30 and the drop across resistor 30 will not be sufficient to cause the tube 42 to conduct. Thus only tube 46 will conduct and only the gate 98 will open to divert the sheet into bin 114.

When a sheet which is 10% thinner than the specified thickness passes through the gage, it will cause current to flow through the instrument circuit in the opposite direction so that the pointer 14 will move to the negative side of meter 12. Also, the wire 24 remote from element 13 will become positive with respect to wire 64 and the grids 50G and 54G will be driven positive enough to permit tubes 50 and 54 to conduct. At approximately the same time the establishment of potential between wires 64 and 66 will permit tubes 50 and 54 to conduct, thus energizing coils 72 and 74 and closing contacts 80c and 82c. This in turn energizes coils 92 and 94 to open the deflector gates 100 and 102 to cause the inspected sheet to be diverted into bin 116. After the sheet being inspected passes out of the gage, the parts of the device will assume their original positions. When a sheet which is 5% undergage passes through the gage, the operation will be the same except that there will not be sufficient positive potential impressed on grid 50G to cause tube 50 to conduct so that only tube 54 will conduct and gate 102 will open to deflect the sheet into bin 118. After the sheet being gaged passes out of the gage, the parts of the device will assume their original positions.

When a sheet which is within the specified tolerance passes through the gage there will not be sufficient current flowing through the instrument circuit to permit conduction of any of the tubes 42, 46, 50 and 54 and the sheet will be permitted to pass over all the deflector gages and conveyors into bin 120.

While we have described the operation of the device for classifying sheets into 5% undergage and overgage and 10% undergage and overgage a greater or lesser number of classifications can be made. For a greater number of classifications it is necessary to provide additional tubes similar to tubes 42, 46, 50 and 54. The percentages of undergage and overgage of the sheets being classified may be varied as desired by changing the positions of arms 40, 44, 48 and 52.

While one embodiment of my invention has been shown and described it will be apparent that other adaptations and modifications may be made without departing from the scope of the following claims.

I claim:

1. Apparatus for automatically gaging and classifying sheets or the like comprising a pair of conveyors arranged in tandem over which sheets pass, a deflector at the exit end of the first conveyor for deflecting sheets from the path of travel to the second conveyor, a thickness gage having a voltage output and arranged in operative relationship with the first conveyor for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means and said gage, means preventing the operation of said circuit when there is no sheet in the gage, means controlled by said circuit for operating said deflector, a timer connected in said circuit in operative relationship with said deflector operating means, and means responsive to the output of said first named means through the timer for energizing said operating means to move said deflector to direct a sheet from its path of travel.

2. Apparatus for automatically gaging and classifying sheets or the like comprising a pair of conveyors arranged in tandem over which sheets pass, a deflector at the exit end of the first conveyor for deflecting sheets from the path of travel to the second conveyor, a thickness gage having a voltage output and arranged in operative relationship with the first conveyor for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means, said gage, a resistor and a meter for measuring the impulse from said gage, a by-pass circuit associated with said first named circuit, normally closed relay contacts in said by-pass circuit, a relay coil for operating said contacts, a source of light on one side of sheets passing over the first conveyor, a photoelectric cell on the opposite side of sheets passing over the first conveyor, a circuit from said photoelectric cell to said relay coil for energizing said coil to open said contacts when a sheet is passing through said gage, means for operating said deflector, a timer having contacts in circuit with said deflector operating means, and means responsive to the voltage drop across said resistor including said timer for energizing said operating means through the timer contacts to move said deflector to direct a sheet from the path of travel.

3. Apparatus for automatically gaging and classifying sheets or the like comprising a plurality of conveyors arranged in tandem over which sheets pass, a deflector between adjacent conveyors for deflecting selected sheets from their path of travel, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means, said gage and two resistors arranged in series, means preventing the operation of said circuit when there is no sheet in the gage, separate means for operating each of said deflectors, a timer in operative relationship with each of said deflector operating means, means responsive to the voltage drop across one of said resistors for energizing one of said timers to cause the associated operating means to operate its deflector, and means responsive to the voltage drop across the other of said resistors for energizing another of said timers to cause its associated operating means to operate its deflector.

4. Apparatus for automatically gaging and classifying sheets or the like comprising a plurality of conveyors arranged in tandem over which sheets pass, a deflector between adjacent conveyors for deflecting selected sheets from their path of travel, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means, said gage and a meter for measuring the impulse from said gage, a by-pass circuit associated with said first named circuit, normally closed relay contacts in said by-pass circuit, a relay coil for operating said contacts, a source of light on one side of sheets passing over the first conveyor, a photoelectric cell on the opposite side of sheets passing over the first conveyor, a circuit from said photoelectric cell to said relay coil for energizing said coil to open said contacts when a sheet is passing through said gage, two resistors connected in series with said gage, separate means for operating each of said deflectors, a timer in operative relationship with each of said deflector operating means, means responsive to the voltage drop across one of said resistors including one of said timers for energizing its associated operating means to operate its deflector, and means responsive to the voltage drop across the other of said resistors including another of said timers for energizing its associated operating means to operate its deflector.

5. Apparatus for automatically gaging and classifying sheets or the like comprising a plurality of conveyors arranged in tandem over which sheets pass, a deflector between adjacent conveyors for deflecting selected sheets from their path of travel, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means, said gage and resistor, means preventing the operation of said circuit when there is no sheet in the gage, separate means for operating each of said deflectors, a timer in operative relationship with each of said deflector operating means, each of said timers having means in operative relationship therewith for operating its deflector, a pair of potentiometers connected in parallel across said resistor, each of said potentiometers having a movable contact arm, an electrical circuit between one of said arms and the first of said timers for energizing the first of said operating means to operate its deflector, and an electrical circuit between the other of said arms and the second of said timers for energizing the second of said operating means to operate its deflector.

6. Apparatus for automatically gaging and classifying sheets or the like comprising a plurality of conveyors arranged in tandem over which sheets pass, a deflector between adjacent conveyors for deflecting selected sheets from their path of travel, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means, said gage, a resistor and a meter for measuring the impulse from said gage, a by-pass circuit associated with said first named circuit, normally closed relay contacts in said by-pass circuit, a relay coil for operating said contacts, a source of light on one side of sheets passing over the first conveyor, a photoelectric cell on the opposite side of sheets passing over the first conveyor, a circuit from said photoelectric cell to said relay coil for energizing said coil to open said contacts when a sheet is passing through said gage, separate means for operating each of said deflectors, a timer in operative relationship with each of said deflector operating means, each of said timers having means in operative relationship therewith for operating its deflector, a pair of potentiometers connected in parallel across said resistor, each of said potentiometers having a movable contact arm, an electrical circuit between one of said arms and the first of said timers for energizing the first of said operating means to operate its deflector, and an electrical circuit between the other of said arms and the second of said timers for energizing the second of said operating means to operate its deflector.

7. Apparatus for automatically gaging and classifying sheets or the like comprising a plurality of conveyors arranged in tandem over which sheets pass, a deflector between adjacent conveyors for deflecting selected sheets from their path of travel, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to the direct current voltage of either plus or minus polarity when an off-gage sheet is in the gage, a circuit including said means, said gage and a resistor, means preventing the operation of said circuit when there is no sheet in the gage, separate means for operating each of said deflectors, a timer in operative relationship with each of said deflector operating means, each of said timers having a relay with normally open contacts arranged therein, a circuit including each of said normally open contacts and the respective deflector operating means, an amplifying tube in circuit with each of the last named relays, a pair of potentiometers connected in parallel across said resistor, each of said potentiometers having a movable contact arm, an electrical connection between one of said arms and the grid of the tube in operative relationship with the first deflector, and an electrical connection between the other of said arms and the grid of the tube in operative relationship with the second deflector, the second of said tubes being adapted to fire upon less voltage drop across said resistor than the first of said tubes.

8. Apparatus for automatically gaging and classifying sheets or the like comprising a plurality of conveyors arranged in tandem over which sheets pass, a deflector between adjacent conveyors for deflecting selected sheets from their path of travel, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means, said gage, a resistor and a meter for measuring the impulse from said gage, a by-pass circuit associated with said first named circuit, normally closed relay contacts in said by-pass circuit, a relay coil for operating said contacts, a source of light on one side of sheets passing over the first conveyor, a photoelectric cell on the opposite side of sheets passing over the first conveyor, a circuit from said photoelectric cell to said relay coil for energizing said coil to open said contacts when a sheet is passing through said gage, separate means for operating each of said deflectors, a timer in operative relationship with each of said deflector operating means, each of said timers having a relay with normally open contacts arranged therein, a circuit including each of said normally open contacts and the respective deflector operating means, an amplifying tube in circuit with each of the last named relays, a pair of potentiometers connected in parallel across said resistor, each of said potentiometers having a movable contact arm, an electrical connection between one of said arms and the grid of the tube in operative relationship with the first deflector, and an electrical connection between the other of said arms and the grid of the tube in operative relationship with the second deflector, the second of said tubes being adapted to fire upon less voltage drop across said resistor than the first of said tubes.

9. Apparatus for automatically gaging and classifying sheets or the like comprising five conveyors arranged in tandem over which sheets pass, a bin below the exit end of each conveyor, a deflector between adjacent conveyors for deflecting selected sheets downwardly into the respective bins, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means, said gage and two resistors arranged in series, means preventing the operation of said circuit when there is no sheet in the gage, separate means for operating each of said deflectors, a timer in operative relationship with each of said deflector operating means, each of said timers having a relay with normally open contacts arranged therein, a circuit including each of said normally open contacts and the respective deflector operating means, an amplifying tube in circuit with each of the last named relays, a pair of potentiometers connected in parallel across the first of said resistors, each of said potentiometers having a movable contact arm, an electrical connection between one of said arms and the grid of the tube in operative relationship with the first deflector, an electrical connection between the other of said arms and the grid of the tube in operative relationship with the second deflector, the second of said tubes being adapted to fire upon less voltage drop across said first resistor than the first of said tubes, a pair of potentiometers connected in parallel across the second of said resistors, each of said second potentiometers having a movable contact arm, an electrical connection between one of said last named movable arms and the third tube, and an electrical connection between the other of said last named movable arms and the fourth tube, the fourth of said tubes being adapted to fire upon less voltage drop across said second resistor than the third of said tubes.

10. Apparatus for automatically gaging and classifying sheets or the like comprising five conveyors arranged in tandem over which sheets pass, a bin below the exit end of each conveyor, a deflector between adjacent conveyors for deflecting selected sheets downwardly into the respective bins, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means, said gage, two resistors and a meter for measuring the impulse from said gage, a by-pass circuit associated with said first named circuit, normally closed relay contacts in said by-pass circuit, a relay coil for operating said contacts, a source of light on one side of sheets passing over the first conveyor, a photoelectric cell on the opposite side of sheets passing over the first conveyor, a circuit from said photoelectric cell to said relay coil for energizing said coil to open said contacts when a sheet is passing through said gage, separate means for operating each of said deflectors, a timer in operative relationship with each of said deflector operating means, each of said timers having a relay with normally open contacts arranged therein, a circuit including each of said normally open contacts and the respective deflector operating means, an amplifying tube in circuit with each of the last named relays, a pair of potentiometers connected in parallel across the first of said resistors, each of said potentiometers having a movable contact arm, an electrical connection between one of said arms and the grid of the tube in operative relationship with the first deflector, an electrical connection between the other of said arms and the grid of the tube in operative relationship with the second deflector, the second of said tubes being adapted to fire upon less voltage drop across said first resistor than the first of said tubes, a pair of potentiometers connected in parallel across the second of said resistors, each of said second potentiometers having a movable contact arm, an electrical connection between one of said last named movable arms and the third tube, an electrical connection between the other of said last named movable arms and the fourth tube, the fourth of said tubes being adapted to fire upon less voltage drop across said second resistor than the third of said tubes.

11. Apparatus for automatically gaging and classifying sheets or the like comprising a plurality of conveyors arranged in tandem over which sheets pass, a deflector between adjacent conveyors for deflecting selected sheets from their path of travel, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means and said gage, means preventing the operation of said circuit when there is no sheet in the gage, means controlled by said circuit for moving the first of the deflectors to deflect sheets that are the maximum off-gage, and means controlled by said circuit for moving a succeeding deflector to deflect sheets that are the minimum off-gage.

12. Apparatus for automatically gaging and classifying sheets or the like comprising a plurality of conveyors arranged in tandem over which sheets pass, a deflector between adjacent conveyors for deflecting selected sheets from their path of travel, a thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means and said gage, means preventing the operation of said circuit when there is no sheet in the gage, means controlled by said circuit for moving the first of the deflectors to deflect sheets that are the maximum off-gage in one direction, means controlled by said circuit for moving a succeeding deflector to deflect sheets that are the minimum off-gage in the same direction, means controlled by said circuit for moving a deflector following the first deflector to deflect sheets that are the maximum off-gage in the opposite direction, and means controlled by said circuit for moving a deflector following the last named deflector to deflect sheets that are the minimum off-gage in the last named direction.

13. Apparatus for automatically gaging and classifying sheets comprising a pair of conveyors arranged in tandem for supporting said sheets, a deflector between said conveyors for deflecting selected sheets from their path of travel, a non-contact type thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means and said gage, means in operative relationship with said first conveyor operable when there is no sheet passing through said gage for preventing operation of said circuit, means controlled by said circuit for operating said deflector, and means responsive to the output of said first named means and controlling the means controlled by said circuit for operating the said deflector to move said deflector to direct a sheet from its path of travel.

14. Apparatus for automatically gaging and classifying sheets comprising a pair of conveyors arranged in tandem for supporting said sheets, a deflector between said conveyors for deflecting selected sheets from their path of travel, a non-contact type thickness gage having a voltage output and arranged in operative relationship with the first of said conveyors for measuring the thickness of sheets passing thereover, means connected to the output of said gage for changing the impulse therefrom to substantially zero when a sheet of the desired thickness is in the gage and to a direct current voltage of either plus or minus polarity when an off-gage sheet is in the gage, a circuit including said means and said gage, means controlled by said circuit for operating said deflector, means responsive to the output of said first named means for energizing said operating means to move said deflector to direct a sheet from its path of travel, means for controlling the flow of current in said circuit, and means operable by sheets passing through said gage to operate said last named means to permit flow of current in said circuit when a sheet is passing through the gage and prevent flow of current in said circuit when no sheet is passing through the gage.

References Cited in the file of this patent

UNITED STATES PATENTS

| | | |
|---|---|---|
| 2,146,581 | Kaufman | Feb. 7, 1939 |
| 2,312,357 | Odquist | Mar. 2, 1943 |
| 2,518,115 | Bernstein | Aug. 8, 1950 |
| 2,570,288 | Todd | Oct. 9, 1951 |
| 2,679,317 | Roop | May 15, 1954 |